US006968291B1

(12) United States Patent
Desai

(10) Patent No.: US 6,968,291 B1

(45) Date of Patent: Nov. 22, 2005

(54) USING AND GENERATING FINITE STATE MACHINES TO MONITOR SYSTEM STATUS

(75) Inventor: Keyur B. Desai, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 131 days.

(21) Appl. No.: 10/702,150

(22) Filed: Nov. 4, 2003

(51) Int. Cl.[7] .............................................. G06F 11/30

(52) U.S. Cl. ...................... 702/182; 702/183; 709/220; 709/223; 703/23; 370/254

(58) Field of Search ................................ 702/182, 183, 702/184; 709/223, 226, 220, 246, 224, 205, 709/225; 703/23, 25, 27; 370/254, 427, 463, 370/469, 465

(56) References Cited

U.S. PATENT DOCUMENTS

| | | | | |
|---|---|---|---|---|
| 5,640,319 A * | 6/1997 | Beuning et al. | ............... | 700/2 |
| 6,393,386 B1 * | 5/2002 | Zager et al. | .................. | 703/25 |
| 2003/0172150 A1 * | 9/2003 | Kennedy | .................... | 709/224 |

OTHER PUBLICATIONS

Comer, D. J. "Chapter 6: Introduction to State Machines; Chapter 10: Asynchronous State Machines" In *Digital Logic and State Machine Design*. Saunders College Publishing: Philadelphia, etc., 2nd Edition, 1990, pp. i-xii, 239-261, 455-475.

Taub, H. and Donald Schilling, "Preface, Chapter 3: Logic Circuits; and Chapter 6: Asynchronous State Machines," In *Digital Integrated Electronics*.. McGraw-Hill Electrical and Electronic Engineering Series. McGraw-Hill Book Co.: New York, 1977, 1st 5 pages unnumbered, ix-x, 8-133.

* cited by examiner

*Primary Examiner*—Bryan Bui
*Assistant Examiner*—Hien Vo
(74) *Attorney, Agent, or Firm*—Meyertons Hood Kivlin Kowert & Goetzel, P.C.; B. Noël Kivlin

(57) ABSTRACT

Provided are a method, system, and program for monitoring a system including a plurality of subcomponents. An implementation of a plurality of subcomponent finite state machines for subcomponents of the system is provided, wherein each subcomponent finite state machine indicates output values for combinations of input state values related to states in the subcomponent. An implementation of a system finite state machine having output values for combinations of the output values from the subcomponent finite state machines is provided. For each subcomponent finite state machine, a determination is made of the output value by determining the input state values of the subcomponent, processing the subcomponent finite state machine with the determined input state values to determine the subcomponent output value, and processing the system finite state machine with the determined subcomponent output values to determine the system output value.

48 Claims, 12 Drawing Sheets

FIG. 5

Truth Table for Power Supply

| *PS_State* | *Temp_Status* | *Battery_Status* | *Fan_Status* | *Output State* |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | D |
| 0 | 1 | 0 | 0 | D |
| 0 | 1 | 0 | 1 | D |
| 0 | 1 | 1 | 0 | D |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | D |
| 1 | 1 | 0 | 0 | D |
| 1 | 1 | 0 | 1 | D |
| 1 | 1 | 1 | 0 | D |
| 1 | 1 | 1 | 1 | 1 |

FIG. 8

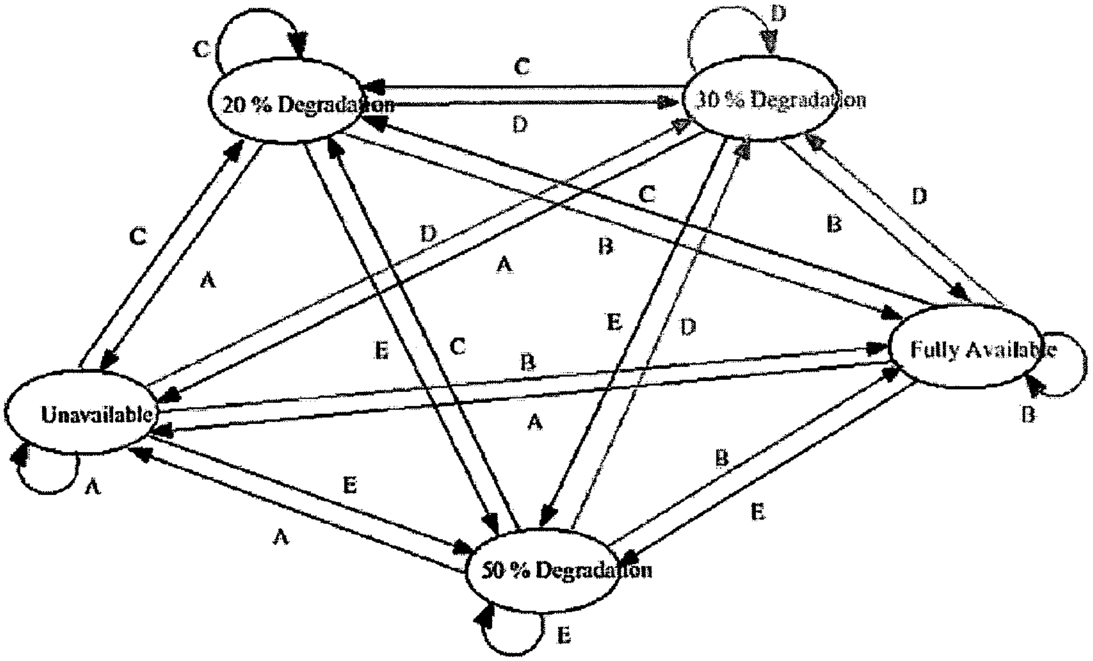

| | |
|---|---|
| Equation A (Power Supply is Bad) | [Temp_Status] * [Battery_Status * Fan_Status] |
| Equation B: (Power Supply is Good) | Temp_Status * Battery_Status * Fan_Status |
| Equation C (20% Degradation in Power Supply) | Temp_Status * Battery_Status * [Fan_Status] |
| Equation D (30% Degradation in Power Supply) | Temp_Status * [Battery_Status] * Fan_Status |
| Equation E (50% Degradation in Power Supply) | [([Temp_Status] * Battery_Status * Fan_Status) + (Temp_Status* [Battery_Status] * [Fan_Status]) |

FIG. 11

Administrative Policy Truth Table

| *Previous Admin State* | *Previous Oper State* | *Current Admin State* | *Current Oper State* | *Alert Clear* | *Alert Create* | *Event* |
|---|---|---|---|---|---|---|
| 0 | 0 | 0 | 0 | 0 | 0 | 0 |
| 0 | 0 | 0 | 1 | 0 | 0 | 1 |
| 0 | 0 | 1 | 0 | 0 | 0 | 1 |
| 0 | 0 | 1 | 1 | 1 | 0 | 1 |
| 0 | 1 | 0 | 0 | 0 | 0 | 1 |
| 0 | 1 | 0 | 1 | 0 | 0 | 0 |
| 0 | 1 | 1 | 0 | 0 | 1 | 1 |
| 0 | 1 | 1 | 1 | 0 | 0 | 1 |
| 1 | 0 | 0 | 0 | 0 | 0 | 1 |
| 1 | 0 | 0 | 1 | 0 | 0 | 1 |
| 1 | 0 | 1 | 0 | 0 | 0 | 0 |
| 1 | 0 | 1 | 1 | 1 | 0 | 1 |
| 1 | 1 | 0 | 0 | 0 | 0 | 1 |
| 1 | 1 | 0 | 1 | 0 | 0 | 1 |
| 1 | 1 | 1 | 0 | 0 | 1 | 1 |
| 1 | 1 | 1 | 1 | 0 | 0 | 0 |

USING AND GENERATING FINITE STATE MACHINES TO MONITOR SYSTEM STATUS

BACKGROUND OF THE INVENTION

1. Field of the Invention

The present invention relates to using and generating finite state machines to monitor system status.

2. Description of the Related Art

A storage area network (SAN) comprises a network linking one or more servers to one or more storage systems. Each storage system could comprise a Redundant Array of Independent Disks (RAID) array, tape backup, tape library, CD-ROM library, or JBOD (Just a Bunch of Disks) components. A managed SAN must ensure both data integrity and data availability, which requires monitoring the health of the storage components in the SAN. The health of the SAN comprises the collective health of the storage devices interconnected in the SAN. Each storage device is comprised of multiple components, such as independent field replaceable units (FRUs), including a power supply, disk drive, loop card, etc., where each of these FRUs have a state and status. The health of each storage device is thus a function of the health of the FRUs and subcomponents therein.

An administrator for a storage device or SAN including monitored subcomponents, e.g., FRUs, may be alerted of problems with a particular storage device in the SAN or FRUs within the storage device. The monitored storage device may include code to notify an administrator upon detecting an error state. Further, an administrator person or program may poll the storage devices to run diagnostic tests to ascertain the health of the storage device.

To determine status, the system may perform synchronous polling where FRUs within the device are polled at intervals to see if an attribute has changed and the value of such changed attribute. Asynchronous polling of the FRUs is performed by polling upon the FRU generating an alert on a state change or problem.

Notwithstanding current techniques for monitoring devices, there is a need in the art for improved techniques for monitoring networks, devices, and FRU components of devices.

SUMMARY

Provided are a method, system, and program for monitoring a system including a plurality of subcomponents. An implementation of a plurality of subcomponent finite state machines for subcomponents of the system is provided, wherein each subcomponent finite state machine indicates output values for combinations of input state values related to states in the subcomponent. An implementation of a system finite state machine having output values for combinations of the output values from the subcomponent finite state machines is provided. For each subcomponent finite state machine, a determination is made of the output value by determining the input state values of the subcomponent, processing the subcomponent finite state machine with the determined input state values to determine the subcomponent output value, and processing the system finite state machine with the determined subcomponent output values to determine the system output value.

Further provided are a method, system, and program for implementing an administrative policy for a device having at least one component. An implementation of an administrative policy finite state machine indicating at least one action to perform for combinations of input administrative and operational states of the component in the device is provided. A determination is made of the input administrative and operational states for the component and the administrative policy state machine is processed with the determined input administrative and operational states to determine at least one action to perform.

Still further provided are a method and program for generating implementations of a plurality of subcomponent finite state machine for subcomponents of a system, wherein each subcomponent finite state machine indicates output values for combinations of input state values related to states in the subcomponent and generating an implementation of a system finite state machine having output values for combinations of the subcomponent output values from the subcomponent finite state machines. Each subcomponent finite state machine is processed with determined input state values for the subcomponent state machine to determine the subcomponent output value and the system finite state machine is processed with the determined subcomponent output values to determine the system output value.

BRIEF DESCRIPTION OF THE DRAWINGS

Referring now to the drawings in which like reference numbers represent corresponding parts throughout:

FIG. 5 illustrates an example of a truth table formed to represent health states for a power supply based on input parameters in accordance with implementations of the invention;

FIG. 8 illustrates a schematic of a finite state machine based on the K-Map of FIG. 6 in accordance with implementations of the invention;

FIG. 11 illustrates an administrative policy truth table in accordance with implementations of the invention;

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
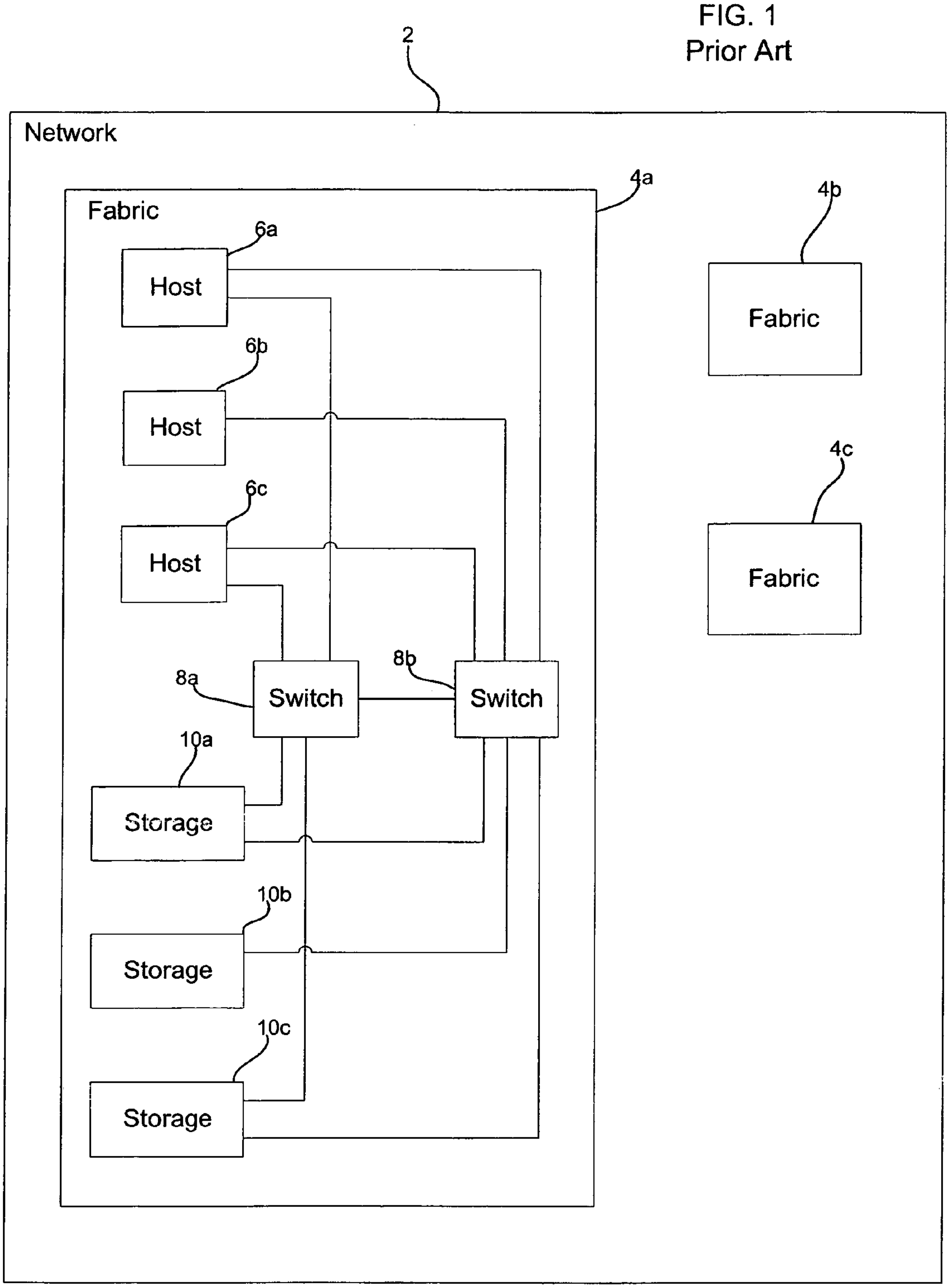
FIG. 1 illustrates an arrangement of network components in a manner known in the art.

FIG. 1 illustrates an example of a network 2, such as a SAN, comprised of multiple fabrics 4a, 4b, 4c, where each fabric includes multiple interconnected devices, also referred to as components, such that the switches in one fabric do not connect to any of the devices in another fabric. As shown in fabric 4a, a fabric includes hosts 6a, 6b, 6c, switches 8a, 8b, and storages 10a, 10b, 10c, where each device in the fabric is connected to one or more other devices in the fabric. The hosts 6a, 6b, 6c, switches 8a, 8b, and storages 10a, 10b, 10c would further each include one or more ports (not shown) to provide one or more connections with another component. The hosts 6a, 6b, 6c include host bus adaptor (HBA) cards (not shown) that include the host ports to connect to switch ports. Further switch 8a, 8b ports may be included in zones, such that any device attached to a switch port in one particular zone can only communicate with devices attached to switch ports in the same zone. Still further, a host may include multiple ports and have different ports connected to different switches, where the switches are not in any way interconnected. In such an arrangement, the host connected to such switches that are not connected is connected to different fabrics. The switches 8a, 8b may be connected via an interswitch link, such as shown in FIG. 1, or not connected.

The hosts 6a, 6b, 6c may comprise any computing device known in the art, such as a server class machine, workstation, storage host, host cluster, etc., having adaptor cards with ports to connect to one switch port in switches 8a, 8b. The switches 8a, 8b may each include multiple switch ports to interconnect different devices in a fabric, wherein the devices may be connected in a network, such as a SAN, Local Area Network (LAN), Wide Area Network (WAN), etc. The storages 10a, 10b, 10c may comprise any storage system known in the art which has compatible ports, such as a storage array, e.g., a storage subsystem, a subsystem cluster, Just a Bunch of Disks (JBOD), Redundant Array of Independent Disks (RAID), Direct Access Storage Device (DASD), etc., tape drive, tape library, disk drive, optical disk drive, etc. The ports within the hosts 6a, 6b, 6c and storages 10a, 10b, 10c may comprise NxPorts, or any other ports known in the art. The network 2 may further include direct attached storage (DAS) devices that connect directly to another host or device other than a switch and orphan devices not connected to any other component.

Figure 2:
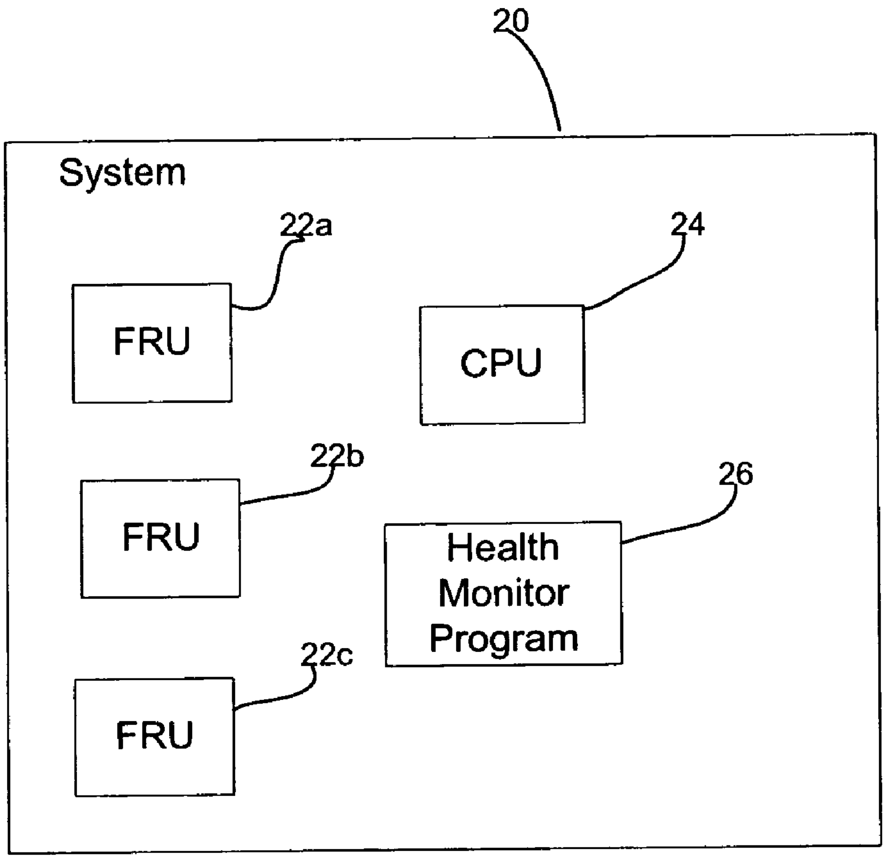
FIG. 2 illustrates components of a system in accordance with implementations of the invention.

FIG. 2 illustrates a system 20 comprised of sub-component field replaceable units (FRUs) 22a, 22b, 22c. A central processing unit (CPU) 24 manages system operations and executes a health monitor program 26 to monitor the health related parameters of the FRUs 22a, 22b, 22c to determine a health value for each FRU and a system 2 health value based on an aggregation of the FRU health values. The health monitor program 26 would implement finite state machines for the FRUs (subcomponent finite state machines) and system (system finite state machine) that are used to determine subcomponent and system health, respectively, based on the input states of the subcomponents and subcomponent output values, respectively, as described below. The CPU 24 and health monitor program 26 may also comprise subcomponents whose health related parameters can be measured to determine their health value, which would then be used as input to determine the aggregate health of the system 20.

Figure 3:
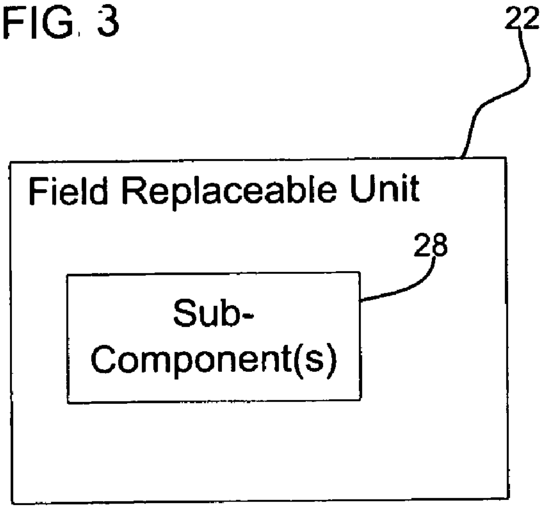
FIG. 3 illustrates components of a field replaceable unit (FRU) of a system in accordance with implementations of the invention.

FIG. 3 illustrates a FRU 22, such as FRUs 22a, 22b, 22c, as including a plurality of subcomponents 30. The health monitor program 26 may include code to query the FRU 22 for information on a subcomponent 28, such as health related parameter information for the FRU, e.g., temperature or the state of the subcomponents 30. The health monitor program 26 may use device driver application programming interfaces (APIs) for the FRUs 22a, 22b, 22c to access health related information therefrom. The health monitor program 26 may be implemented as firmware or a software program loaded into system memory to execute. In certain situations, a FRU may itself include subcomponents, such as additional FRUs. Further, a FRU may itself include a health monitor program, including a subcomponent finite state machine, to determine a health value for each subcomponent 28 and an aggregate FRU health value based on an aggregation of the subcomponents fo the FRU. In such cases, the FRU health monitor program may determine a health value for the FRU and report that health value to the system health monitor program, e.g., 26, to use in determining the system health value as an aggregate of the FRU health values using finite state machines as described below.

There may be any number of FRUs and systems nested in one another so that the health of the subcomponents, which themselves may include FRUs/subcomponents, at one level, is calculated to determine a health value for the subcomponent, which may be passed to the next system/higher level subcomponent that includes the subcomponent whose health value was calculated. For instance, a SAN system comprises storage device subcomponents, where the health value of the SAN as a whole is based on the health value of the various subcomponents of the SAN, such as storage systems, switches, etc. Each of these system components themselves include FRUs and have a health value derived from the aggregate health values of the FRUs within that system component of the network.

Figure 4:
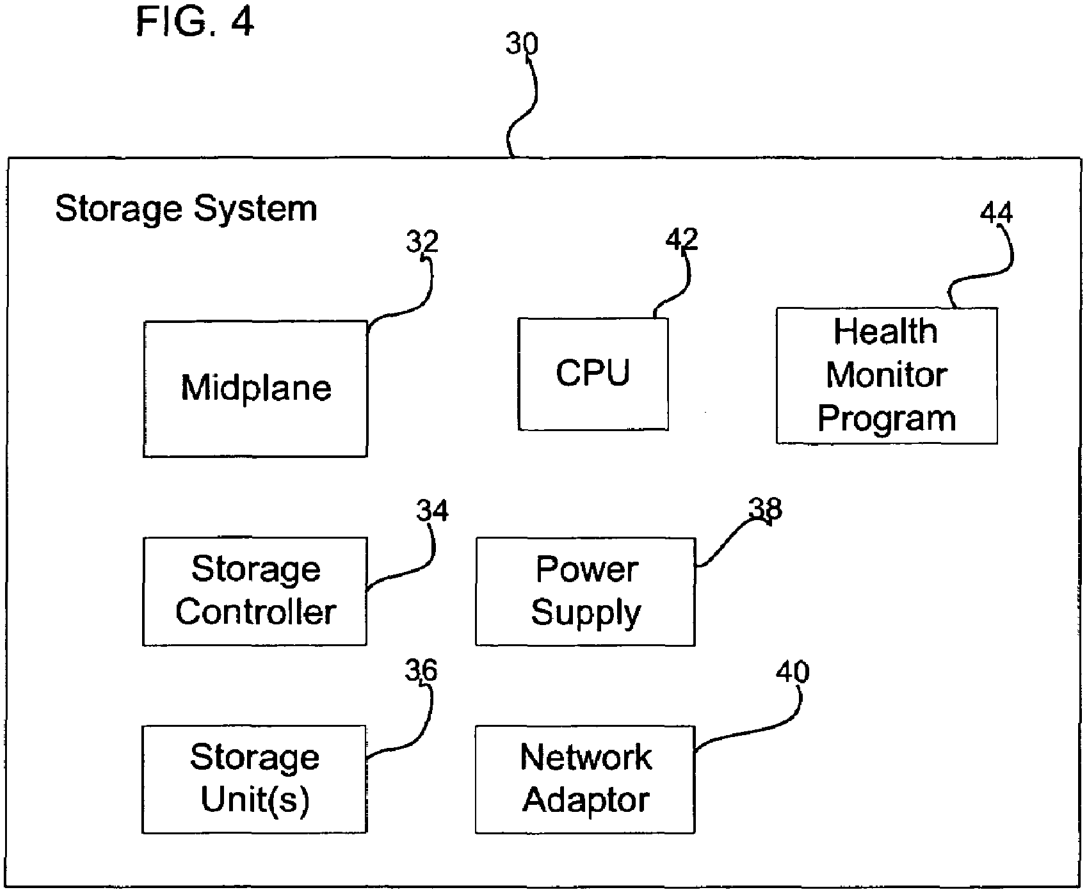
FIG. 4 illustrates components of a storage system in accordance with implementations of the invention.

FIG. 4 illustrates an implementation where the system comprises a storage system 30 having as subcomponents/FRUs a midplane 32, a storage controller 34, storage units 36, a power supply 38, and a network adaptor 40. A storage system CPU 42 manages storage system 30 operations and executes the health monitor program 44 to determine a relative health of the FRUs and, based thereon, the system 30 as a whole. A midplane 32 comprises a backplane secured to an enclosure including the storage system 30. The CPU 42, storage controller 34, network adaptor may be attached to the midplane 32. The storage controller 34 manages I/O access to one or more attached storage units 36. For instance, if the storage units 36 comprise hard disk drives, then the storage controller 34 may comprise a hard disk drive controller such as a Redundant Array of Independent Disks (RAID) controller, a Just a Bunch of Disks (JBOD) controller, a Small Computer Systems Interface (SCSI) controller, etc. If the storage units 36 comprise tape cassettes, then the storage controller 34 may comprise a tape drive interface.

In described implementations, the developer of the health monitor program 44 would have to empirically determine how different health related parameters could affect the health of the sub-components of the system, where the system health comprises an aggregation of the health of the subcomponents. For instance, the health of the storage system 30 may be determined by a weighted aggregation of the health of the FRUs 32, 34, 36, 38, 40, and 42. The developer would create a truth table that considers different states and effects of a subcomponent/FRU on the system health and then for each possible combination of FRU health values, determine the system health value for that combination of subcomponent/FRU health values. In certain implementations, there may be two or more possible health values, such as good, bad, degraded and/or different levels of degraded.

FIG. 5 illustrates an example of a truth table a developer would prepare that has a row for each possible combination of the input states and parameter values that are used to determine the health for a power supply, e.g., 38 (FIG. 4). In the truth table of FIG. 5, the output health value of the power supply, e.g., 38, indicated in the last column, is derived from the following health related parameters: power supply state (PS_State), temperature status (Temp_Status), battery status (Battery_Status), and fan status (Fan_Status). The developer would empirically measure and observe the health of the power supply 38 that occurs for each combination of health related parameters included in each row of the truth table and then record the observed health value for that row as the health output value. For instance, if the power supply state and temperature status are bad, but the battery status and fan status are good, then according to the truth table of FIG. 4, the output state or health is degraded. A similar analysis may also be performed for the other FRUs of the system to determine the health values based on different combinations of health related parameters and values. For instance, the truth table for the storage controller 34 may include as inputs the firmware version level and a status and the truth table for the mid plane 32 may include as inputs the midplane state and status parameter values.

After developing a truth table, the developer may then create a K-map, which is used to derive a finite state machine to provide two or more health values based on different input parameter and state values of the subcomponent being measured. The K-map would allow identification of the transitions between health parameter and state values that produce specific health states, e.g., 0, 1 or D. From this K-map, the developer can determine finite state machine equations to model the health values for each combination of measured parameters and states.

Figure 6:
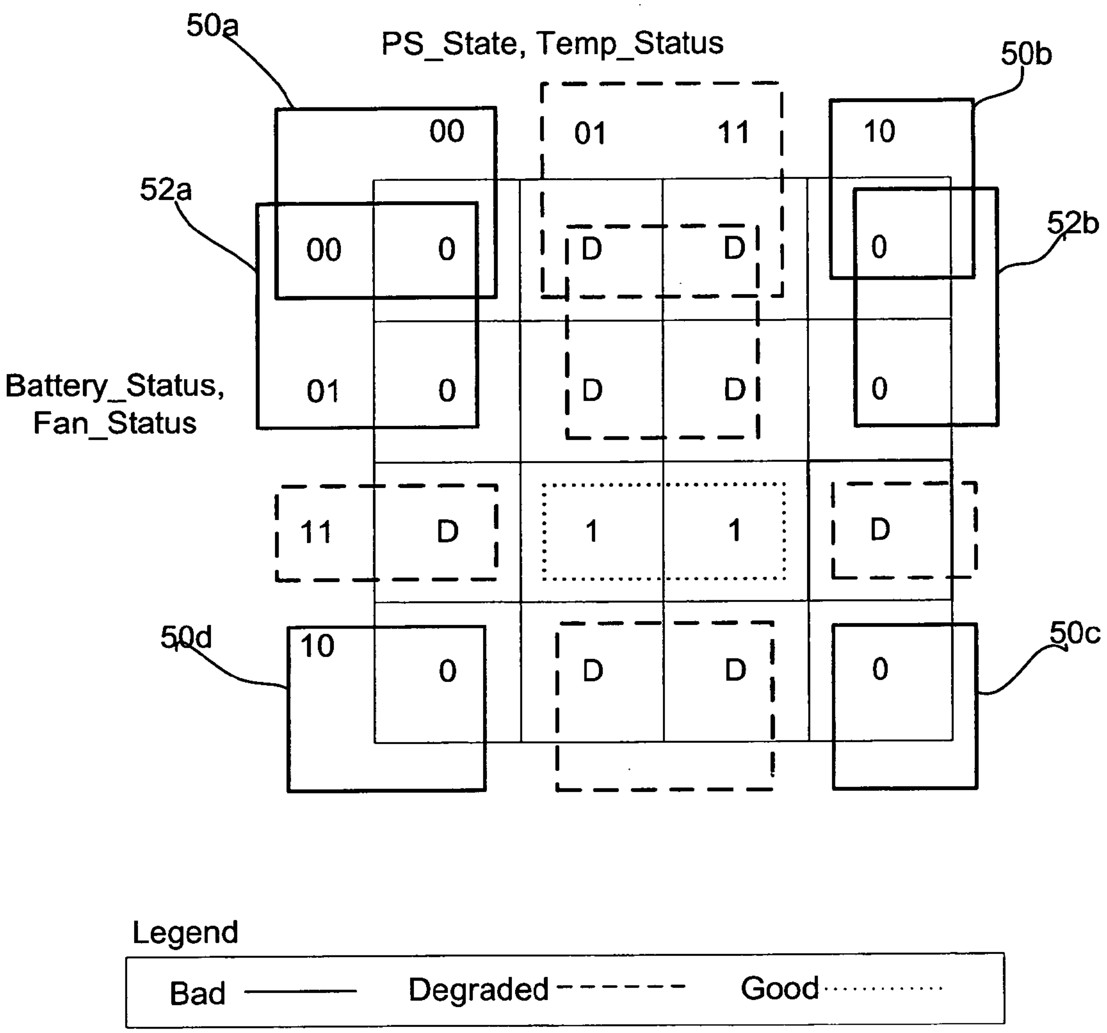
FIGS. 6 and 7 illustrate examples of K-Maps based on a truth table providing health states for a power supply in accordance with implementations of the invention.
Figure 7:
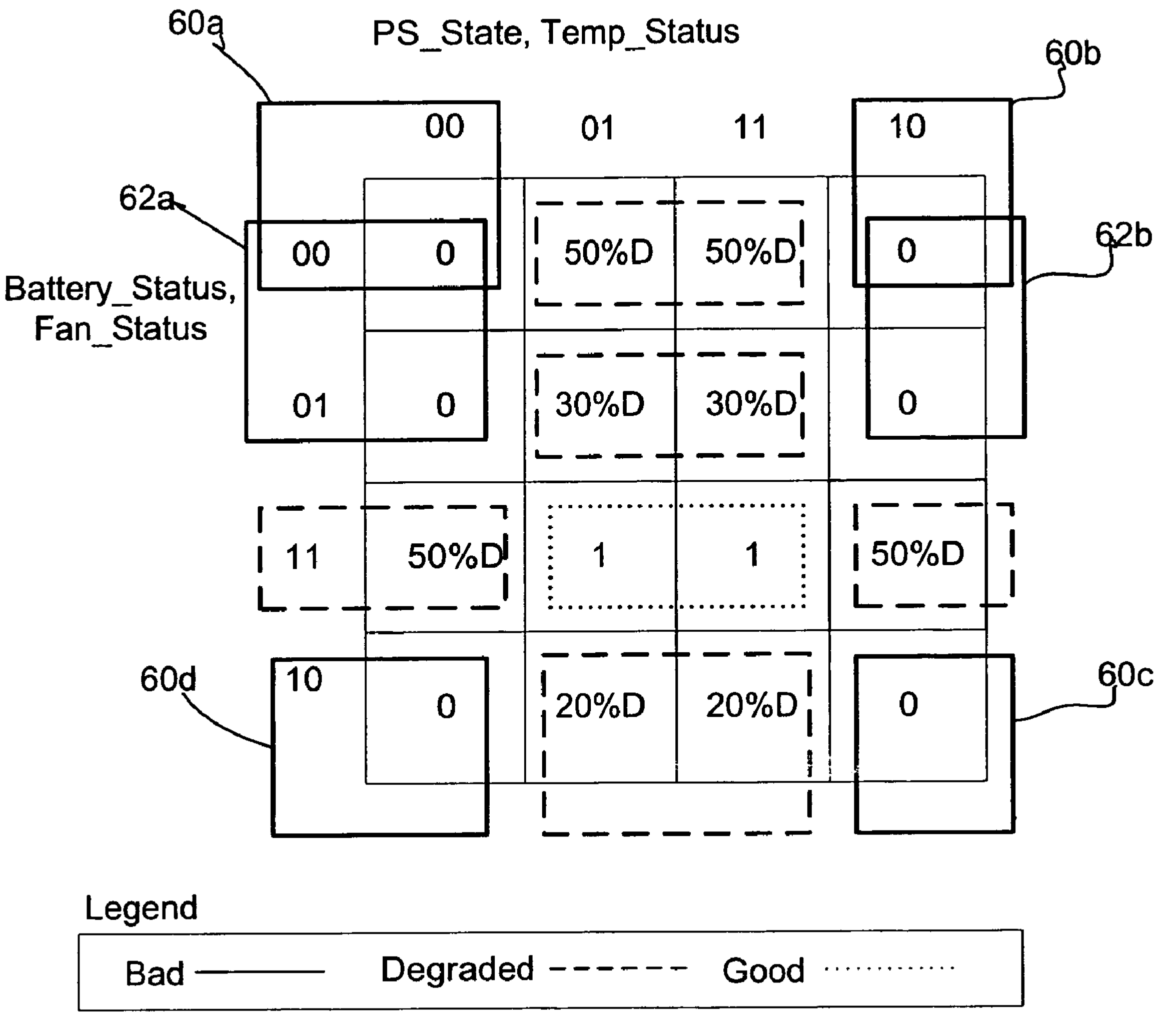

FIGS. 6 and 7 illustrate K maps, where the different pattern of the dashed lines designate different health states as shown in the Legends of FIGS. 6 and 7. The line pattern of the boxes surrounding cells indicate input states having the same output value. The transitions between states occur when the input states indicated in one cell transitions to another cell representing input states that are in another box representing different output values. For instance, when the input states of 0, 0, 0, 0 values changes to 0, 0, 0, 1, the output value has changed from bad to good indicating a transition to a new output state or value. Further, any four adjacent cells in the K map that have the same output value form a separate quad or box, where the quad may wrap around from one side to another. For instance, the cells surrounded by boxes 50*a*, 50*b*, 50*c*, 50*d* indicating the "bad" state are part of a single quad and the cells surrounded by boxes 52*a* and 52*b* are part of a quad or box representing an output value applying to adjacent cells representing input states. Similarly, in FIG. 7, the cells in boxes 60*a*, 60*b*, 60*c*, 60*d* comprise one quad indicating the "bad" state and the cells in boxes 62*a* and 62*b* represent another quad.

For instance, based on the K-map of FIG. 6, the health of a good power supply, e.g., output state of "1" is represented below in equation (1):

Temp_Status*Battery_Status*Fan_Status. (1)

According to equation (1), the health is good if the three mentioned statuses, Temp_Status, Battery_Status, and Fan_Status are all "1" values, i.e., good health. The health of a bad power supply, e.g., output state of "0", is represented below in equation (2):

[Temp_Status]*[Battery_Status*Fan_Status] (2)

According to equation (2), the health is bad if the Temp_Status value is bad ("0" and either Battery_Status has a bad ("0") value or Fan_Status has a bad value. Including two statuses in brackets indicates that just either of the two states need be bad. Further, a degraded health value, e.g., output state of "D", is represented below in equation (3):

(Temp_Status*[Battery_Status*Fan_Status])+
([Temp_Status]* Battery_Status*Fan_Status). (3)

According to equation (3), the health is a degraded state if the temperature status is good (1) and the battery or fan statuses are bad (0). In this way, the three finite state machine equations (1), (2), and (3) model a fine state machine indicating different possible output health values for the power supply based on the four input statuses and parameters.

For each of the subcomponents, i.e., FRUs, of the system 30, e.g., 32, 34, 36, 38, 60, 42, and 44, similar truth tables may be used to generate K-Maps, which in turn are used to generate the finite state machine equations to model the health output values for the different subcomponents. A system truth table may use as inputs the final health output value for each of the FRUs to determine an health output value for the system as a whole, based on an aggregation of the health output values of the component FRUs.

Further, although one or more possible degraded output states are possible, certain sub-components may have only two possible states, such as good (1) and bad (0) and other subcomponents may have three or more possible health values, good, bad and one or more degraded levels. The equations to determine the health of the subcomponents and overall system are coded into the health monitor program 44. Still further, numerous different assignments of degradation weights to the health related parameters may be used based on empirical testing and knowledge.

In further implementations, the developer may observe and assign multiple degraded states indicating different levels of degradation. FIG. 7 illustrates a K-map where multiple degradation weights are assigned, such as a 20%, 30% and 50% degraded. For instance, a fan status of bad (0) has a lower impact on degradation, e.g., 20%, than the battery status, which produces a degradation of 30% or 50%. Further, the power supply state has no effect on the health, and can thus be disregarded in the finite state machine equations. The developer may make these determinations of degraded levels based on observations and measurements when generating the truth tables and determining health output values based on the inputs of temperature status, battery status, fan status, and power supply state. Further, based on the truth table having multiple levels of degraded, such as shown in FIG. 7, the developer would create equations for good health, bad health and each different grade or level of degradation.

For instance, based on the K-map of FIG. 7, the health of a good power supply, e.g., output state of "1" is shown below in equation (5):

Temp_Status*Battery_Status*Fan_Status. (5)

According to equation (5), the health is good if the three mentioned statuses, Temp_Status, Battery_Status, and Fan_Status are all "1" values, i.e., good health. The health of a bad power supply, e.g., output state of "0", is shown below in equation (6):

[Temp_Status]*[Battery_Status*Fan_Status] (6)

According to equation (6), the health is bad if the Temp_Status value is bad ("0" and either Battery_Status has a bad ("0") value or the Fan_Status has a bad value. Further, the health of a 20% degraded power supply, e.g., output state of "20% D", is expressed below in equation (7):

$$Temp\_Status*Battery\_Status*[Fan\_Status] \quad (7)$$

According to equation (7), the health is 20% degraded if the temperature and battery status are good (1) and the fan status is bad (0). The health of a 30% degraded power supply, e.g., output state of "30% D", is expressed below in equation (8):

$$Temp\_Status*[Battery\_Status]*Fan\_Status \quad (8)$$

According to equation (8), the health is 30% degraded if the temperature and fan status are good (1) and the battery status is bad (0). The health of a 50% degraded power supply, e.g. output state of "50% D", is expressed below in equation (9):

$$([Temp\_Status]*Battery\_Status*Fan\_Status)+ (Temp\_Status*[Battery\_Status]*[Fan\_Status]) \quad (9)$$

Figure 9:
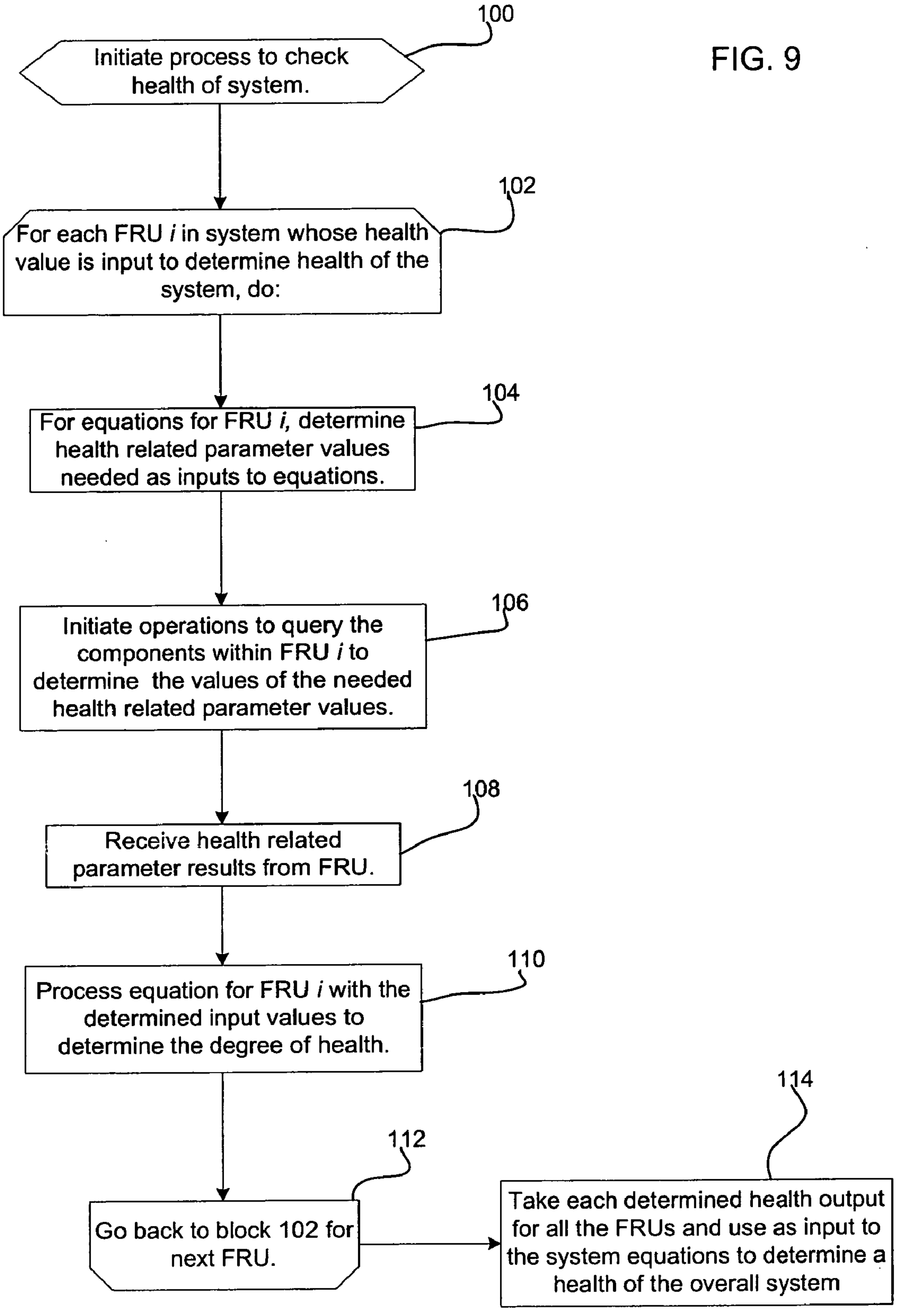
FIG. 9 illustrates operations to monitor the health of a system in accordance with implementations of the invention.

According to equation (9), the health is in a 50% degraded state if the temperature status is good (1) and the battery and fan statuses are bad (0) or if the temp status is good (1) and the battery and fan statuses are bad (0). In this way, the equations 5–9 9 model a finite state machine indicating one of five different possible output health values for the power supply based on the four input status. FIG. 9 illustrates a schematic of a finite state machine implementing the equations (5)–(9) discussed above.

The above examples show how equations coding a state machine may be ascertained for the subcomponents or FRUs of a system. The developer would also create a truth table including a column for each FRU for which health is measured to provide system health output values for each different possible combination of FRU health output values. The truth table would require more health output states if additional degraded health states are possible for the final FRU health values. From this truth table, the developer would then create K-maps and then equations coding system health output values based on the inputs of the health output values of the subcomponents. Still further, the subcomponents themselves may include FRUs whose health is independently determined based on the health related parameters and values for such FRUs. In this way, the value of a subcomponent would comprise the aggregation of the health values of the FRUs within the subcomponents.

FIG. 9 illustrates operations performed by the health monitor program, e.g., 44, to determine an overall health value of the storage system, e.g., 30 (FIG. 4) based on the health values of the component FRUs, where the health monitor program 44 is encoded with finite state machine equations to determine the health values of each FRU subcomponent and then use these FRU health values as input to a set of equations to determine the system health value. Upon initiating (at block 100) the process to check the system health, a loop is performed at blocks 102 through 112 for each FRU i, e.g., 32, 34, 36, 38, 040, 42, 44, in the system, e.g., 30. The health monitor program 44 determines (at block 104) the health related parameters needed as input to the equations for FRU i and then initiates (at block 106) operations to query the FRU i to determine the health related parameter values for the finite state machine equations for FRU i. This querying process may involve using device driver APIs for FRU i to access registers and information on the needed parameter values and states therein. Upon receiving (at block 108) the state and/or parameter values needed as input, the health monitor program 44 processes (at block 110) the received input health related parameter values with the equations of FRU i to determine the health output value for FRU i. After determining the output health values for each FRU sub-component, the health monitor program 44 uses (at block 144) these FRU health values as input to the finite state machine equations for the system health to provide the output system health value. The health monitor program 44 may take further action based on the output health value, such as notify, email, message, etc., an administrator with the determined health value or execute a program to take another health responsive action.

In the operations of FIG. 9, the health monitor program maintains equations for each FRU to determine the FRU health values. In alternative implementations, certain of the FRUs may include their own health monitor program including finite state machine equations, where those FRUs would run their own health monitor program to independently determine their own health. In such implementations, the system health monitor program 44 would use an API to query the FRU for its health output value, which the system health monitor program 44 would then use as input to the system finite state machine determine the overall system health value.

Figure 10:
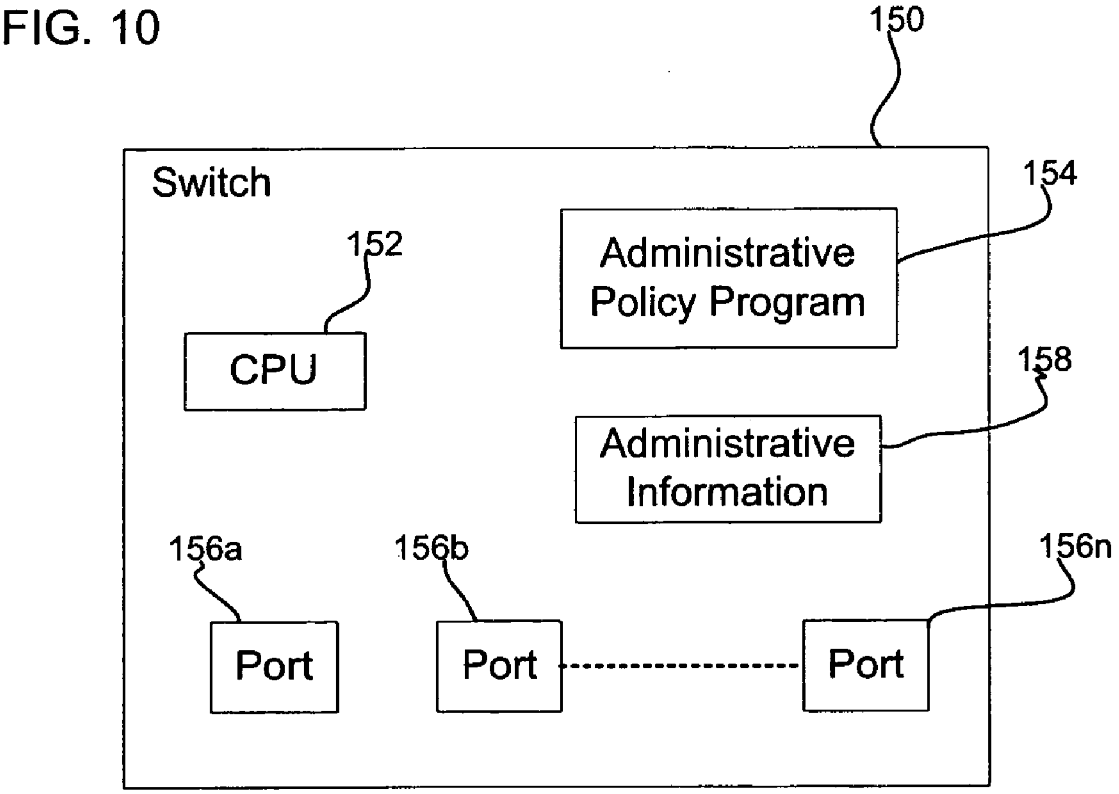
FIG. 10 illustrates components of a switch in accordance with implementations of the invention.

The described implementations may also be used to implement a policy for a system component based on various state values of that component. FIG. 10 illustrates a switch 150 including a CPU 152 and an administrative policy program 154 that initiates policy actions based on the state of switch ports **156*a*, 156*b* . . . 156*n*. The administrative policy program 154 maintains administrative information 158, which includes information for each port on the current and previous administrative and operational states. The administrative state indicates whether the administrator set the port to be offline (0) or online (1) and the operational state indicates whether the port is in fact offline (0) or online (1). The administrative information 158** may be updated whenever an administrator takes action affecting the administrative state or the operational state is determined.

FIG. 11 illustrates a truth table showing different administrative actions to take, such as create an alert, clear an alert or an event based on the current and previous administrative and operational states for a port, that would be maintained in the administrative information 158. A value of "0" for the current and previous administrative and operational states indicates that such states are "offline" and a value of "1" indicates that such states are "online". For the alert create action, which generates an alert, a value of "0" indicates no alert is generated based on the administrative and operational states and a value of "1" indicates to generate an alert based n the states. For the alert clear action, which ends an alert state, a value of "1" indicates to clear the alert and a value of "0" indicates to not clear the alert. An event policy specifies an action to take, other than an alert, if the previous and current operational and administrative states have specified values. Thus, the policy truth table of FIG. 11 provides different interrelated actions to take for a port **156*a*, 156*b* . . . 156*n* depending on the operational and administrative states for such port maintained in the administrative information 158**.

The developer may generate equations to express the finite state machine based on the truth table, which may involve generating a K-Map to assist in determining the equations. Equation (10) below expresses the equation for when an event would be generated for the truth table in FIG. 10:

If (Previous Admin State!=Current Admin State OR Previous Oper State!= Current Oper State) then Generate Event (10)

With equation (10) an event is generated, which may call another routine to perform a set of actions, if the previous administrative or operational state are not equal to the current administrative or operational state, respectively.

Equation (11) below expresses the equation for when an alert is to be created:

Previous Oper State*[Current Oper State]*Current Admin State (11)

According to equation (11), an alert is created if the previous operational state and current administrative state are online and the current operational state is offline, where a bracketed state name indicates an "offline" value. In this way, if the operating state of the port changes from online to offline and the current administrative state of the port is online, then an alert is initiated to alert the administrator that the port has gone offline after the administrator set the port online.

Equation (12) below expresses the equation for when an alert is cleared:

[Previous Oper State]*Current Oper State*Current Admin State (12)

According to equation (12), an alert is cleared if the current operational state and current administrative state are online and the previous operational state is offline. In this way, if the operating state of the port changes from offline to online and the current administrative state of the port is online, than an alert is cleared because the administrator requested state has occurred.

The developer may then code the above finite state machine equations into the administrator policy program 154. The same set of finite state machine equations may be used for all ports, or there may be port specific sets of equations.

Figure 12:
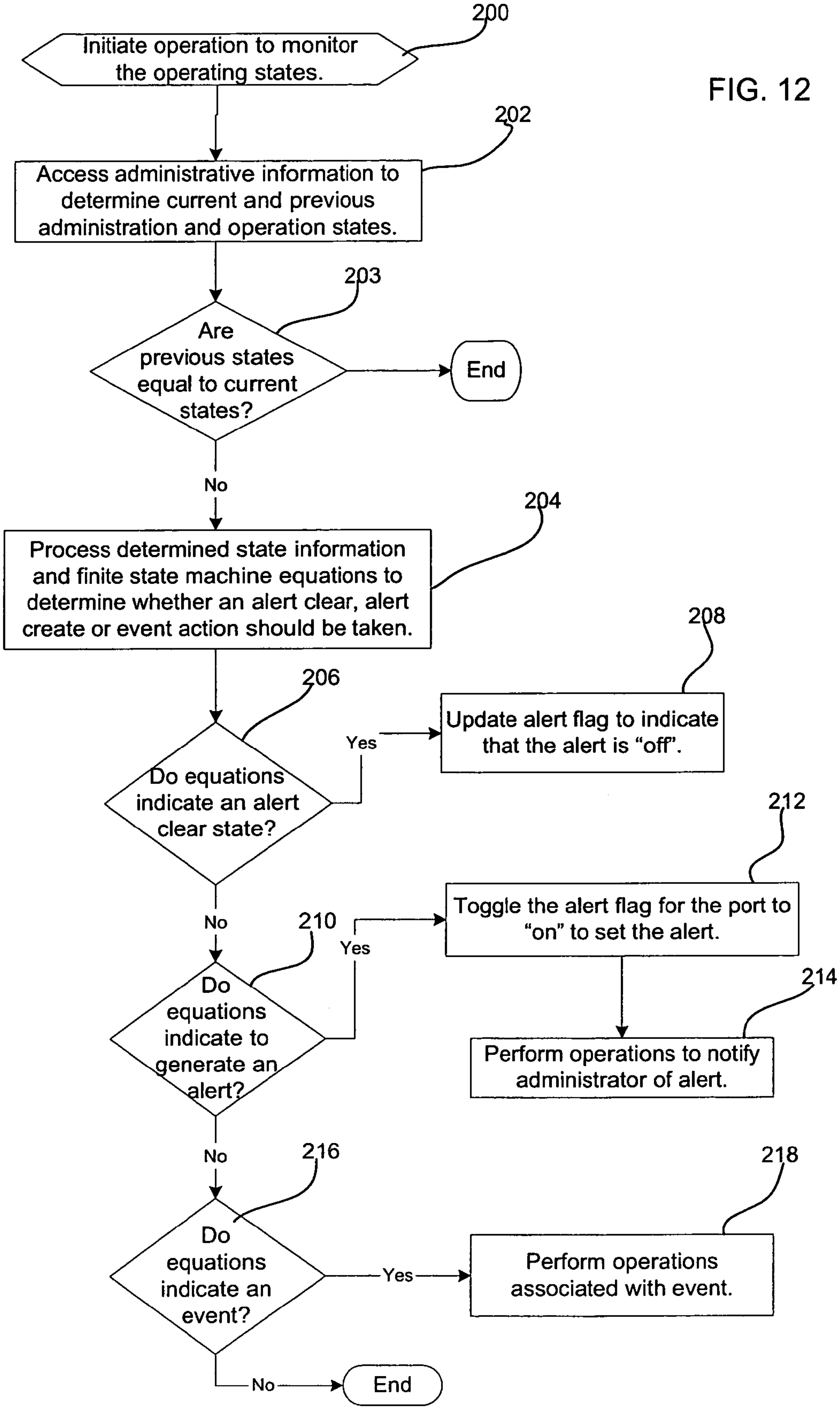
FIG. 12 illustrates operations to implement an administrative policy in accordance with implementations of the invention.

FIG. 12 illustrates operations performed by an administrative policy program 154 based on administrative and operational states of a port 156*a*, 156*b* . . . 156*n* in a switch 150. Upon initiating (at block 200) an operation to monitor the operating states for a specified port 156*a*, 156*b* . . . 156*n*, the administrative policy program 154 accesses (at block 202) administrative information 158 for the specified port to determine the current and previous administration and operational states for the port. If (at block 203) the previous states are equal to the current states, then there is no state change and control ends. Otherwise, if the current and previous states differ then control proceeds to block 204 to determine whether the change is such that an event and action need to be triggered. At block 204, the program 154 processes the determined state information and the finite state machine equations to determine whether an alert clear, alert create, event action or no action should be taken. If (at block 206) the finite state machine equations, e.g., equations 10, 11, and 12 set forth above, indicate that an alert clear action should be taken, then an alert flag, which may be included in the administrative information 158, is set (at block 208) to "off" to indicate that the alert for the port is no longer activated. At this point, the administrator may be notified that the alert has been deactivated. If (at block 210) the finite state machine equations indicate that the an alert should be created, then the alert flag is set (at block 212) "on" and operations are executed (at block 214) to notify the administrator of the alert, which may comprise the rendering of an alert dialog box graphical user interface on an administrator computer, an email, pager notification, voice mail, etc. If (at block 216) the equations indicate that an event has occurred, then the program 154 performs (at block 218) the operations associated with the event.

In additional implementations, a truth table may be generated for an entire network, e.g., 2 (FIG. 1), which uses as input the health of the components of the network, e.g., 2, such as the storages 10*a*, 10*b*, 10*c* and switches 8*a*, 8*b*. Each component of the network may execute their own health monitoring program to generate an output health value based on input comprising the health values of the subcomponents (e.g., FRUs,) within the network component, e.g., switch, storage system, etc. The health values of the network components would then be inputted to the network finite state machine equations to produce an output health value for the network based on the aggregate health values of the network components.

Figure 13:
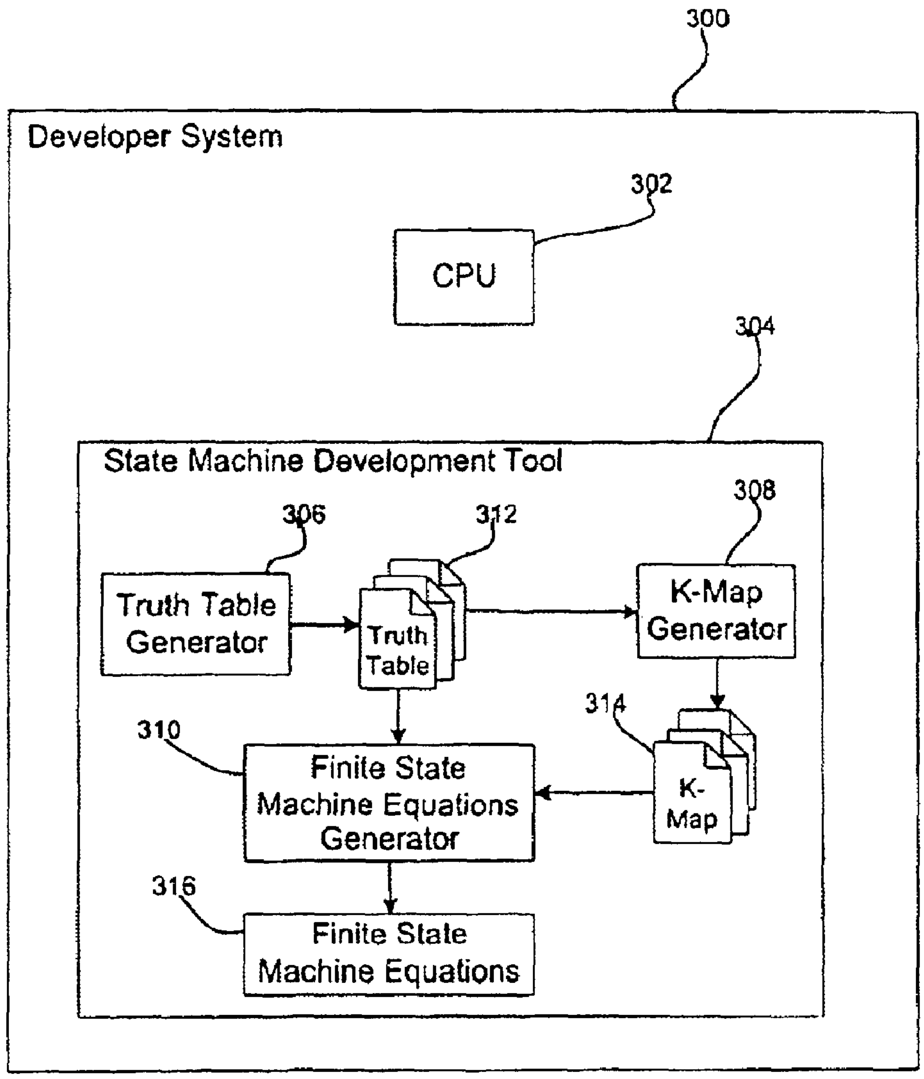
FIG. 13 illustrates a developer system used to generate equations modeling finite state machines for a system and the components therein in accordance with implementations of the invention.

FIG. 13 illustrates a developer system 300 that may be used to generate the equations that would be implemented in a monitoring program, such as the health monitoring program 44 of FIG. 4 or the administrative policy program 154 of FIG. 9. The developer system 300 includes a CPU 302 and a state machine development tool 304, including a truth table generator 306, a K-Map generator 308, and a finite state machine equation generator 310. The developer may create truth tables 312 for a system and its subcomponents, e.g., FRUs, using the truth table generator 306 by entering observed output states based on various user specified input parameters and states. The truth tables created with the truth table generator 306 may then be inputted to the K-Map generator 308 to generate K-Maps 314 representing the transitions between states. Either the created truth tables 312 or K-Maps 314 may be inputted to the finite state machine equation generator 310 to produce the finite state machine equations 316 that represent the different output states for all possible combinations of input states. These finite state machine equations 316 may then be coded into the health monitor program or administrative policy program that will be included with the system to monitor health or implement administrative policies.

The described techniques for generating and executing a finite state machine for a system may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The above discussed FRUs comprised hardware components in the system. Additionally, the FRUs may comprise application programs.

The logic of FIGS. 9 and 12 describe specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel. Yet further, the described operations may be performed by a single processing unit or by distributed processing units.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for monitoring a system including a plurality of subcomponents, comprising:

providing an implementation of a plurality of subcomponent finite state machines for subcomponents of the system, wherein each subcomponent finite state machine indicates output values for combinations of input state values related to states in the subcomponent;

providing an implementation of a system finite state machine having output values for combinations of the output values from the subcomponent finite state machines; and for each subcomponent finite state machine, determining the output value by:

(i) determining the input state values of the subcomponent; and (ii) processing the subcomponent finite state machine with the determined input state values to determine the subcomponent output value; and processing the system finite state machine with the determined subcomponent output values to determine the system output value.

2. The method of claim 1, wherein the input states comprise health related parameters of the subcomponents.

3. The method of claim 1, wherein the output values for the subcomponents indicate health values of the subcomponents and wherein the system output value indicates a health value of the system.

4. The method of claim 1, wherein the subcomponent and system finite state machines are processed by a program, wherein determining the input state values of at least one of the subcomponents comprises querying the subcomponents for the input state values, wherein the program processes the determined subcomponent values and subcomponent finite state machines to determine the subcomponent output values, and wherein the program processes the subcomponent output values and the system finite state machine to determine the system output value.

5. The method of claim 1, wherein at least one subcomponent determines the input state values and processes the subcomponent finite state machine and the input state values to determine the subcomponent output value, wherein a program queries the at least one subcomponent to determine the subcomponent output value for that queried subcomponent, and wherein the program processes the system finite state machine and subcomponent output values to determine the system output value.

6. The method of claim 1, wherein the system comprises a storage device and wherein the subcomponents comprise at least one of a power supply, storage controller, storage units, network adaptor, and midplane.

7. The method of claim 1, wherein a network is comprised of a plurality of systems, further comprising:

providing an implementation of a network finite state machine having output values for combinations of the output values from system finite state machines, wherein each system includes one system finite state machines and at least one subcomponent finite state machine to determine the system output value;

determining the system output values from each system finite state machine; and processing the network finite state machine with the determined system output values to determine the network output value.

8. The method of claim 1, wherein there are at least three possible output values, indicating a good, bad and at least one degraded state.

9. The method of claim 1, wherein the at least one action indicates to take no action.

10. A method for implementing an administrative policy for a device having at least one component, comprising:

providing an implementation of an administrative policy finite state machine indicating at least one action to perform for combinations of input administrative and operational states of the component in the device;

determining the input administrative and operational states for the component; and processing the administrative policy state machine with the determined input administrative and operational states to determine at least one action to perform.

11. The method of claim 10, wherein the input administrative and operational states include a current and previous administrative and operational states of the component, and wherein the administrative and operational states comprise offline or online.

12. The method of claim 10, wherein the at least one action indicates to either clear an alert or generate an alert.

13. The method of claim 10, wherein the at least one action is capable of indicating to generate an event indicating operations to perform.

14. The method of claim 10, wherein the device comprises a switch and wherein the components comprise ports on the switch.

15. A method, comprising:

generating implementations of a plurality of subcomponent finite state machine for subcomponents of a system, wherein each subcomponent finite state machine indicates output values for combinations of input state values related to states in the subcomponent; and generating an implementation of a system finite state machine having output values for combinations of the subcomponent output values from the subcomponent finite state machines, wherein each subcomponent finite state machine is processed with determined input state values for the subcomponent state machine to determine the subcomponent output value, and wherein the system finite state machine is processed with the determined subcomponent output values to determine the system output value.

16. The method of claim 15, wherein generating the subcomponent and system finite state machines, comprises:

generating a plurality of subcomponent truth tables for the subcomponents, wherein each subcomponent truth table has an observed output value for each combination of input state values related to states in the subcomponent;

generating a system truth table having an observed output value for each combination of the subcomponent output values from the subcomponent finite state machines;

processing the subcomponent truth tables to generate the subcomponent finite state machines; and processing the system truth table to generate the system finite state machine.

17. The method of claim 15, wherein generating the subcomponent and system finite state machines, comprises:

generating a plurality of subcomponent truth tables for the subcomponents, wherein each subcomponent truth table has an observed output value for each combination of input state values related to states in the subcomponent;

generating one subcomponent K-Map for each subcomponent truth table to organize the subcomponent output values for different input state value combinations;

generating a system truth table having an observed output value for each combination of subcomponent output values from the subcomponent finite state machines;

generating a system K-Map for the system truth table to organize the system output values for different input subcomponent output value combinations;

processing the subcomponent K-Maps to generate the subcomponent finite state machines; and processing the system K-Map to generate the system finite state machine.

18. The method of claim 15, wherein the system and subcomponent output values are capable of indicating good, bad and at least one degradation level.

19. A system, comprising:

(a) a plurality of subcomponents;

(b) a computer readable medium including:

(i) a representation of a plurality of subcomponent finite state machines for subcomponents of the system, wherein each subcomponent finite state machine indicates output values for combinations of input state values related to states in the subcomponent; and (ii) a representation of a system finite state machine having output values for combinations of the output values from the subcomponent finite state machines; and (c) code capable of being executed in the system to perform:

(i) for each subcomponent finite state machine, determining the output value by:

(a) determining the input state values of the subcomponent; and (b) processing the subcomponent finite state machine with the determined input state values to determine the subcomponent output value; and (ii) processing the system finite state machine with the determined subcomponent output values to determine the system output value.

20. The system of claim 19, wherein the input states comprise health related parameters of the subcomponents.

21. The system of claim 19, wherein the output values for the subcomponents indicate health values of the subcomponents and wherein the system output value indicates a health value of the system.

22. The system of claim 19, wherein the code comprises a program executing external to the subcomponents, wherein determining the input state values of at least one of the subcomponents comprises querying the subcomponents for the input state values, wherein the program processes the determined subcomponent values and subcomponent finite state machines to determine the subcomponent output values, and wherein the program processes the subcomponent output values and the system finite state machine to determine the system output value.

23. The system of claim 19, wherein the code comprises at least one program within at least one subcomponent and one program external to the subcompoennts, wherein the at least one program within the subcomponent determines the input state values and processes the subcomponent finite state machine and the input state values to determine the subcomponent output value, wherein the program external to the subcompoennts queries the at least one subcomponent to determine the subcomponent output value for that queried subcomponent, and wherein the program external to the subcomponents processes the system finite state machine and subcomponent output values to determine the system output value.

24. The system of claim 19, wherein the system comprises a storage device and wherein the subcomponents comprise at least one of a power supply, storage controller, storage units, network adaptor, and midplane.

25. The system of claim 19, wherein the system is included in a network connecting a plurality of systems, wherein the systems in the network include system finite state machines to determine system output values, further comprising:

a representation of a network finite state machine in the computer readable medium having output values for combinations of the output values from system finite state machines, wherein each system includes one system finite state machines and at least one subcomponent finite state machine to determine the system output value; and wherein the code is further capable of being executed to perform:

(i) determining the system output values from each system finite state machine; and (ii) processing the network finite state machine with the determined system output values to determine the network output value.

26. A device, comprising:

(a) at least one component;

(b) a computer readable medium including a representation of an administrative policy finite state machine indicating at least one action to perform for combinations of input administrative and operational states of the component in the device; and (c) code capable of being executed to perform:

(i) determining the input administrative and operational states for the component; and (ii) processing the administrative policy state machine with the determined input administrative and operational states to determine at least one action to perform with respect to the component.

27. The device of claim 26, wherein the input administrative and operational states include a current and previous administrative and operational states of the component, and wherein the administrative and operational states comprise offline or online.

28. The device of claim 26, wherein the at least one action indicates to either clear an alert or generate an alert.

29. The device of claim 26, wherein the at least one action is capable of indicating to generate an event indicating operations to perform.

30. The device of claim 26, wherein the device comprises a switch and wherein the components comprise ports on the switch.

31. An article of manufacture for monitoring a system including a plurality of subcomponents, wherein the article of manufacture causes operations to be performed, the operations comprising:

providing an implementation of a plurality of subcomponent finite state machines for subcomponents of the system, wherein each subcomponent finite state machine indicates output values for combinations of input state values related to states in the subcomponent;

providing an implementation of a system finite state machine having output values for combinations of the output values from the subcomponent finite state machines; and for each subcomponent finite state machine, determining the output value by:

(i) determining the input state values of the subcomponent; and (ii) processing the subcomponent finite state machine with the determined input state values to determine the subcomponent output value; and processing the system finite state machine with the determined subcomponent output values to determine the system output value.

32. The article of manufacture of claim 31, wherein the input states comprise health related parameters of the subcomponents.

33. The article of manufacture of claim 31, wherein the output values for the subcomponents indicate health values of the subcomponents and wherein the system output value indicates a health value of the system.

34. The article of manufacture of claim 31, wherein the subcomponent and system finite state machines are processed by a program, wherein determining the input state values of at least one of the subcomponents comprises querying the subcomponents for the input state values, wherein the program processes the determined subcomponent values and subcomponent finite state machines to determine the subcomponent output values, and wherein the program processes the subcomponent output values and the system finite state machine to determine the system output value.

35. The article of manufacture of claim 31, wherein at least one subcomponent determines the input state values and processes the subcomponent finite state machine and the input state values to determine the subcomponent output value, wherein a program queries the at least one subcomponent to determine the subcomponent output value for that queried subcomponent, and wherein the program processes the system finite state machine and subcomponent output values to determine the system output value.

36. The article of manufacture of claim 31, wherein the system comprises a storage device and wherein the subcomponents comprise at least one of a power supply, storage controller, storage units, network adaptor, and midplane.

37. The article of manufacture of claim 31, wherein a network is comprised of a plurality of systems, wherein the operations further comprise:

providing an implementation of a network finite state machine having output values for combinations of the output values from system finite state machines, wherein each system includes one system finite state machines and at least one subcomponent finite state machine to determine the system output value;

determining the system output values from each system finite state machine; and processing the network finite state machine with the determined system output values to determine the network output value.

38. The article of manufacture of claim 31, wherein there are at least three possible output values, indicating a good, bad and at least one degraded state.

39. An article of manufacture for implementing an administrative policy for a device having at least one component, wherein the article of manufacture causes operations to be performed, the operations comprising:

providing an implementation of an administrative policy finite state machine indicating at least one action to perform for combinations of input administrative and operational states of the component in the device;

determining the input administrative and operational states for the component; and processing the administrative policy state machine with the determined input administrative and operational states to determine at least one action to perform.

40. The article of manufacture of claim 39, wherein the input administrative and operational states include a current and previous administrative and operational states of the component, and wherein the administrative and operational states comprise offline or online.

41. The article of manufacture of claim 39, wherein the at least one action indicates to either clear an alert or generate an alert.

42. The article of manufacture of claim 39, wherein the at least one action is capable of indicating to generate an event indicating operations to perform.

43. The article of manufacture of claim 39, wherein the device comprises a switch and wherein the components comprise ports on the switch.

44. The article of manufacture of claim 39, wherein the at least one action indicates to take no action.

45. An article of manufacture for causing operations to be performed, the operations comprising:

generating implementations of a plurality of subcomponent finite state machine for subcomponents of a system, wherein each subcomponent finite state machine indicates output values for combinations of input state values related to states in the subcomponent; and generating an implementation of a system finite state machine having output values for combinations of the subcomponent output values from the subcomponent finite state machines, wherein each subcomponent finite state machine is processed with determined input state values for the subcomponent state machine to determine the subcomponent output value, and wherein the system finite state machine is processed with the determined subcomponent output values to determine the system output value.

46. The article of manufacture of claim 45, wherein generating the subcomponent and system finite state machines, comprises:

generating a plurality of subcomponent truth tables for the subcomponents, wherein each subcomponent truth table has an observed output value for each combination of input state values related to states in the subcomponent;

generating a system truth table having an observed output value for each combination of the subcomponent output values from the subcomponent finite state machines;

processing the subcomponent truth tables to generate the subcomponent finite state machines; and processing the system truth table to generate the system finite state machine.

47. The article of manufacture of claim 45, wherein generating the subcomponent and system finite state machines, comprises:

generating a plurality of subcomponent truth tables for the subcomponents, wherein each subcomponent truth table has an observed output value for each combination of input state values related to states in the subcomponent;

generating one subcomponent K-Map for each subcomponent truth table to organize the subcomponent output values for different input state value combinations;

generating a system truth table having an observed output value for each combination of subcomponent output values from the subcomponent finite state machines;

generating a system K-Map for the system truth table to organize the system output values for different input subcomponent output value combinations;

processing the subcomponent K-Maps to generate the subcomponent finite state machines; and processing the system K-Map to generate the system finite state machine.

48. The article of manufacture of claim 45, wherein the system and subcomponent output values are capable of indicating good, bad and at least one degradation level.

* * * * *